US005629688A

United States Patent [19]

Muramatsu et al.

[11] Patent Number: 5,629,688

[45] Date of Patent: May 13, 1997

[54] RADIO SELECTIVE CALLING RECEIVER STORING MESSAGES BASED ON SENDING-GROUP NAMES

[75] Inventors: Toshihiko Muramatsu, Tokyo; Hiroaki Shibayama, Shizuoka, both of Japan

[73] Assignee: NEC Corporation, Tokyo, Japan

[21] Appl. No.: 429,527

[22] Filed: Apr. 26, 1995

[30] Foreign Application Priority Data

Apr. 28, 1994 [JP] Japan .................................... 6-092483

[51] Int. Cl.[6] ........................................ H04Q 1/00

[52] U.S. Cl. ................................ 340/825.44; 340/825.47; 340/311.1

[58] Field of Search ......................... 340/825.44, 825.47, 340/825.56, 311.1

[56] References Cited

U.S. PATENT DOCUMENTS

| | | | |
|---|---|---|---|
| 4,197,526 | 4/1980 | Levine et al. | 340/825.44 X |
| 5,173,688 | 12/1992 | Deluca et al. | 340/825.44 |
| 5,272,475 | 12/1993 | Eaton et al. | 340/825.44 |
| 5,394,140 | 2/1995 | Wong et al. | 340/825.44 |
| 5,398,021 | 3/1995 | Moore | 340/825.44 X |
| 5,414,418 | 5/1995 | Andros, Jr. | 340/825.47 X |
| 5,453,739 | 9/1995 | Kuramatsu | 340/825.44 |
| 5,461,663 | 10/1995 | Motegi | 340/825.44 X |
| 5,493,284 | 2/1996 | Kondo | 340/825.44 |
| 5,499,020 | 3/1996 | Motohashi et al. | 340/825.44 |

FOREIGN PATENT DOCUMENTS

| | | |
|---|---|---|
| 1-181338 | 7/1989 | Japan . |
| 1-288120 | 11/1989 | Japan . |
| WO90/11655 | 10/1990 | WIPO . |

OTHER PUBLICATIONS

Patent Abstracts of Japan, vol. 14, No. 70 (E-0886), Feb. 8, 1990 & JP-A-01 288120, Nov. 20, 1989.

*Primary Examiner*—Michael Horabik
*Assistant Examiner*—William H. Wilson, Jr.
*Attorney, Agent, or Firm*—Scully, Scott, Murphy & Presser

[57] ABSTRACT

In a radio selective calling receiver capable of receiving and displaying a plurality of address codes and a plurality of messages, a group write control section stores received messages and address codes in a RAM while matching them to each other in accordance with an EEPROM and handling, among names given to the address codes, identical names as a group. A group read control causes, in the event of message display and in response to a first command signal, a predetermined number of messages to be displayed on an LCD in a group together with an address name. Subsequently, the control causes, one of the predetermined number of messages to be displayed on the LCD in response to a second command signal.

12 Claims, 9 Drawing Sheets

| ID INFORMATION | NAME |
|---|---|
| 1-A | PRIVATE |
| 1-B | COMPANY |
| 1-C | |
| 1-D | |
| 2-A | PRIVATE |
| 2-B | COMPANY |
| 2-C | |
| 2-D | |
| 3 | INFORMATION |
| 4 | INFORMATION |
| 5 | PRIVATE |
| 6 | PRIVATE |

| Name | Private | Company | Information |
|---|---|---|---|
| Message | 1: Come to Station (1-A) | 1: Phone (1-B) | 1: April 12 Rain (3) |
| | 2: 5963 (5) | 2: Contract O.K. (2-B) | 2: NEC ¥19 (4) |
| | 3: 084 (5) | 3: In trouble (1-B) | 3: April 13 Cloudy (3) |
| | 4: 12 (6) | | 4: BANK ¥5 (4) |
| | 5: I'll BE LATE (2-A) | | 5: April Mostly Cloudy (3) |

FIG. 6

| ADDRESS | NAME |
|---|---|
| 1-A | Shibayama |
| 1-B | Company |
| 1-C | |
| 1-D | |
| 2-A | Shibayama |
| 2-B | Company |
| 2-C | |
| 2-D | |
| 3 | Weather Forecast |
| 4 | Stock Information |
| 5 | Others |
| 6 | Others |

FIG. 7

| Name | Shibayama | Company | Weather Forecast | Stock Information | Others |
|---|---|---|---|---|---|
| Message | 1: Come to Station (1-A) | 1: Phone (1-B) | 1: April 12 Rain (3) | 1: NEC ¥19 | 1: 5963 (5) |
| | 2: I'll BE LATE (2-A) | 2: Contract O.K. (2-B) | 2: April 13 Cloudy (3) | 2: BANK ¥5 | 2: 084 (5) |
| | | 3: In trouble (1-B) | 3: April Mostly Cloudy (3) | | 3: 12 (6) |

RADIO SELECTIVE CALLING RECEIVER STORING MESSAGES BASED ON SENDING-GROUP NAMES

BACKGROUND OF THE INVENTION

1. Field of the Invention

The present invention relates to a radio selective calling receiver and, more particularly, to a radio selective calling receiver having a plurality of addresses.

2. Description of the Related Art

A radio selective calling receiver, e.g., a radio pager, having a plurality of registered address codes is disclosed in, for example, Japanese Patent Laid-Open Publication No. 1-288120. In this type of pager, the address codes are each assigned to a particular information source. For example, address codes A and B are respectively used to receive messages from a company for which a user of the pager works, and messages from the user's families. Further, address codes C and D are respectively available for a currency rate or similar information service and the quick report of sports results. The pager displays a single received message associated with one address code at a time.

With a pager of the type described, it is preferable that the user can identify the caller who sent a message to the pager. For this purpose, the caller or the information source may send the caller's name or the source's name together with a message. This, however, increases the amount of data and, therefore, charges which the caller must pay.

In the light of the above, Japanese Patent Laid-Open Publication No. 1-181338, for example, teaches a radio pager capable of displaying a caller's code together with a received message. Specifically, considering the fact that the address codes each being allocated to a particular caller is included in a received signal, the pager displays the caller's code corresponding to the address code. This type of pager, however, brings about another problem that the user must memorize the callers' codes and the callers corresponding thereto. Particularly, when the number of callers and that of information sources are great, the user's memory will be treacherous. In addition, displaying a single message at a time is not desirable from the efficiency standpoint.

SUMMARY OF THE INVENTION

It is, therefore, an object of the present invention to provide a radio selective calling receiver capable of displaying a caller together with a message without increasing the amount of data to be sent.

It is another object of the present invention to provide a radio selective calling receiver capable of displaying a plurality of messages received from a single caller.

A radio selective calling receiver of the present invention includes a display for displaying a received message and a name corresponding to a caller sent the message. In addition, the receiver includes a receiver for receiving the message and an address code, a memory for storing the message in correspondence with the address code, and reading means for reading the message out of the memory. When a plurality of messages from the caller are received or the stored messages are read out of the memory, the messages are displayed together with the name.

In accordance with the present invention, names each corresponding to a particular address code to be received with a message are registered at the pager beforehand. The name is displayed together with the message. This allows the user to easily identify the caller sent the message.

BRIEF DESCRIPTION OF THE DRAWINGS

These and other objects, features and advantages of the present invention will become more fully apparent from the following detailed description taken with the accompanying drawings in which:

FIG. 6 indicates another specific relation between the kinds of addresses and names;

FIG. 7 illustrates a specific format associated with the relation of FIG. 6 and in which messages are stored;

In the drawings, the same reference numerals denote the same structural elements.

DESCRIPTION OF THE PREFERRED EMBODIMENT

Figure 1:
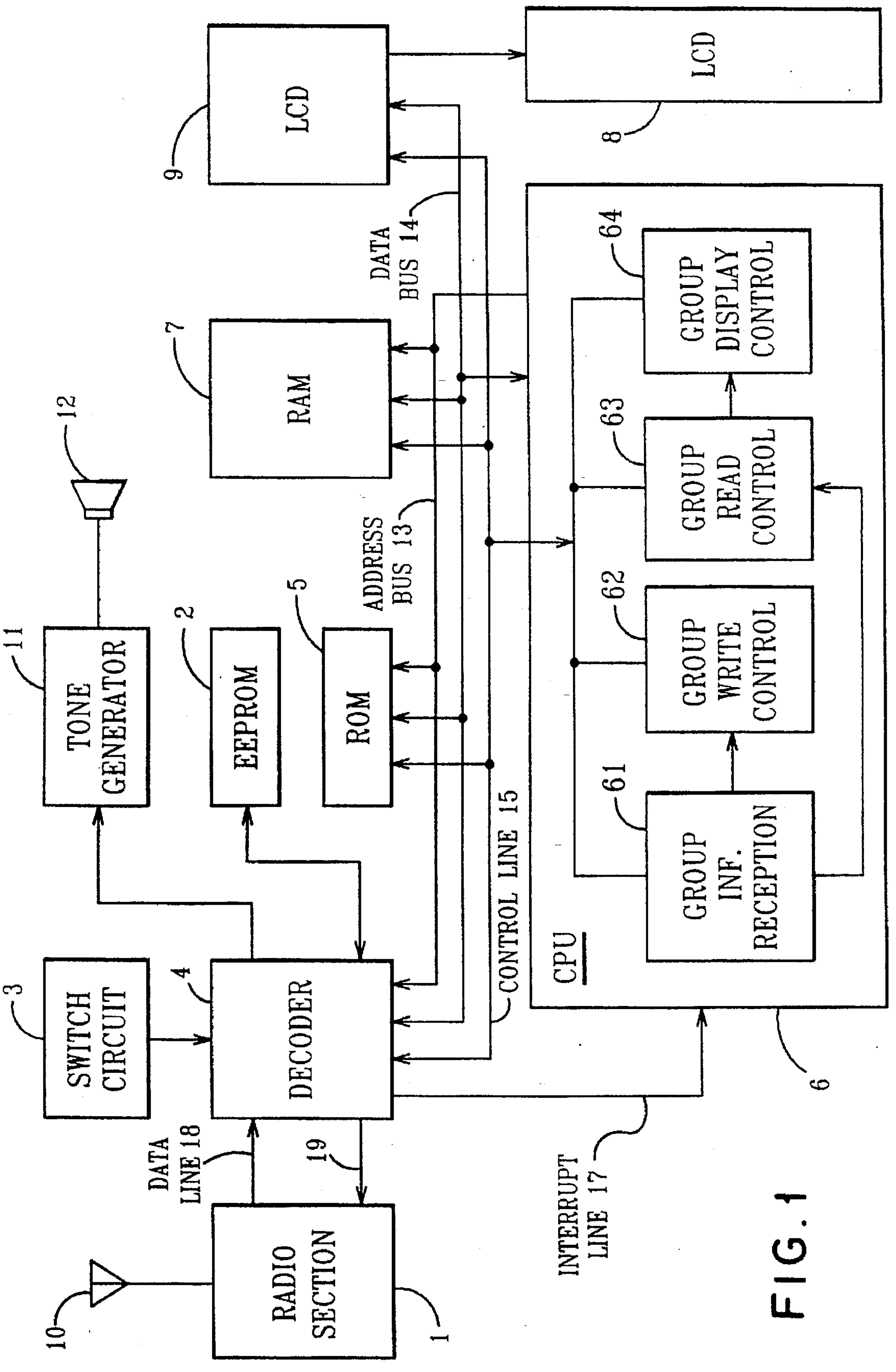
FIG. 1 is a block diagram schematically showing a preferred embodiment of a radio selective calling receiver according to the present invention.

Referring to FIG. 1 of the drawings, a radio selective calling receiver embodying the present invention is shown. As shown, the receiver includes a radio section 1, an Electrically Erasable Programmable Read Only Memory (EEPROM) 2, a switching circuit 3, a decoder 4, a Read Only Memory (ROM) 5, a Central Processing Unit (CPU) 6, a Random Access Memory (RAM) 7, an Liquid Crystal Display (LCD) 8, an LCD driver 9, an antenna 10, a tone generator 11, and a speaker 12.

Figures 2, 3:
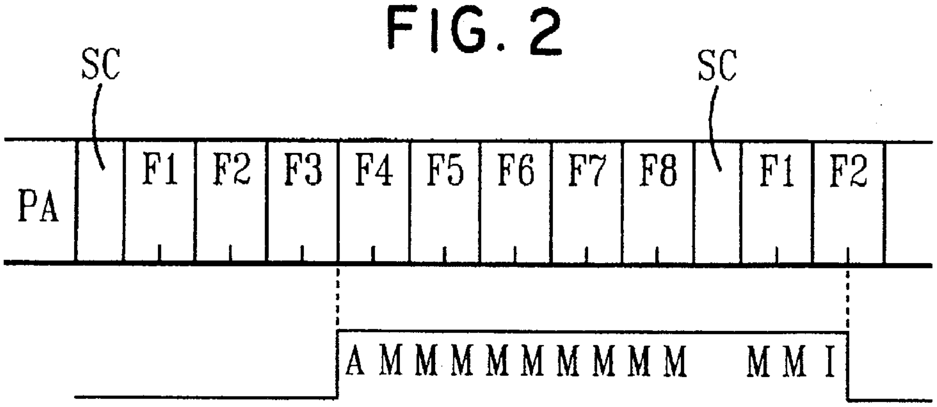
FIG. 2 illustrates a preferred signal format particular to a paging signal.
FIG. 3 illustrates a specific relation between the kinds of addresses and names with which the present invention is practicable.

A paging signal from a base station, not shown, is received by the antenna 10 and applied to the radio section 1. The radio section 1 demodulates the input signal. As shown in FIG. 2, the paging signal consists of, for example, a preamble signal PA, a frame synchronizing signal SC, and a plurality of groups F1–F8 each having two codewords. Each codeword includes an address code representative of an address number, a message code, and an idle code. Assume that an address number is present in the first codeword of the fourth group F4. Then, if the address number is identical with an address number assigned to the receiver, the receiver receives a message following the address number. On detecting an idle codeword in the group F2, the receiver ends the reception.

FIG. 3 illustrates a specific relation between ID (identification) information corresponding to address codes and names. Preferably, the receiver has twelve different ID information and six different IDs. In the figure, numerals 1–6 are representative of IDs while alphabets A–D attached to numeral 1 and 2 are representative of different functions belonging to the same ID. For example, 1-A, 1-B, 1-C and 1-D belong to the same ID, but they are representative of different functions on the basis of a function bit. Among the ID information, 1-A, 2-A, 5 and 6 are assigned to private messages while 1-B and 2-B are assigned to messages from a company. In the column of names, the blank cells indicate an unregistered state. It should be noted that the number of ID information and that of IDs shown in FIG. 3 are only illustrative. This is also true with the number of names. As for the ID information represented only by numerals 3–6, the function bit may be indicative of A by way of example.

Referring again to FIG. 1, the signal demodulated by the radio section 1 is applied to the decoder 4 over a data line 18. On detecting the assigned address number out of the input signal, the decoder 4 delivers an address code corresponding to the address number and a message following the address code to the CPU 6 over a data bus 14. At the same time, the decoder 4 feeds control information for battery saving to the radio section 1 over a control line 19. The address code assigned to the receiver is read out of the EEPROM 2 and fed to the decoder 4. An address bus 13 is used to transfer address information from the CPU 6 to the decoder 4, ROM 5, and RAM 7.

The switching circuit 3 sends, when operated by the user of the receiver, a command signal to the decoder 4 for causing it to display the received message on the LCD 8. In response, the decoder 4 sends the command signal to the CPU 6 over a control line 15. The ROM 5 stores a program for controlling the receiver.

The CPU 6 writes, based on the program stored in the ROM 5, the received message in the RAM 7 while matching it to the address code. Further, in response to the command signal from the decoder 4 and in accordance with the program, the CPU 6 displays the message matched to the address code on the LCD 8 together with the address name. The LCD driver 9 drives the LCD 8.

When the address number detected by the decoder 4 is identical with the address number assigned to the receiver, the tone generator 11 feeds a tone signal to the speaker 12. In response, the speaker 12 produces an alert tone so as to inform the user of a call reception.

Specifically, the CPU 6 includes a group information reception 61, a group write control 62, a group read control 63, and a group display control 64. These sections 61–64 are controlled by the program stored in the ROM 5. The group information reception 61 receives the address code and message from the decoder 4 and receives a command signal from the switching circuit 2 via the decoder 4. The group write control 62 writes the address code and message in a predetermined area of the RAM 7 while matching them to each other. The group read control 63 reads, in response to a command signal from the reception 61, the message of the designated group (address) out of the RAM 7 together with the address name. The group display control 64 causes the message read out by the control 63 to be displayed on the LCD 8 together with the associated information.

Figure 4:
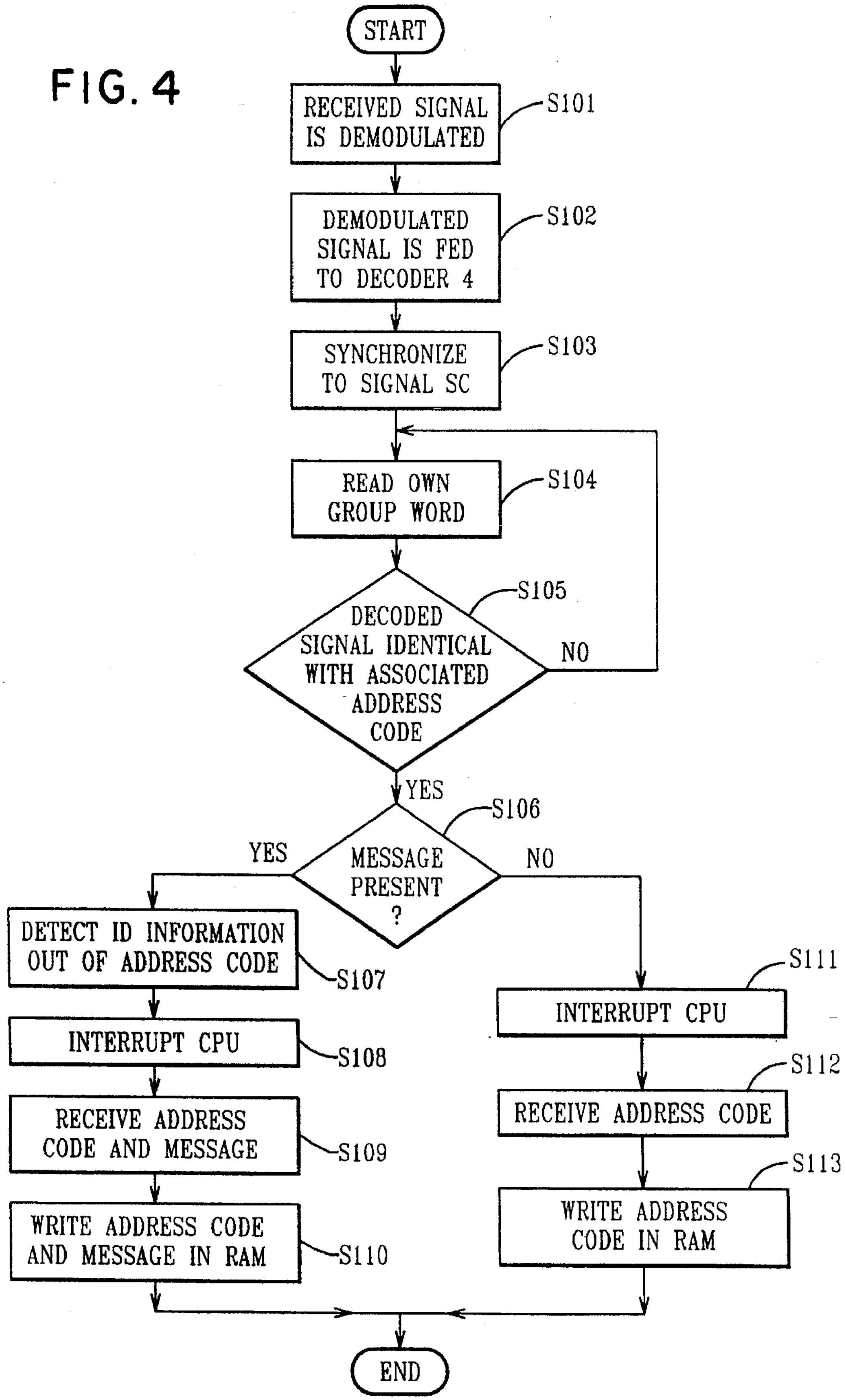
FIG. 4 is a flowchart demonstrating a specific operation of the embodiment.

A reference will be made to FIG. 4 for describing how the receiver processes the received message. First, the received paging signal is demodulated by the radio section 1 (step S101). The demodulated signal is fed to the decoder 4 over the data line 18 (step S102). The decoder 4 detects a frame synchronizing signal SC out of the demodulated signal and synchronizes various timing signals to the signal SC (step S103). Subsequently, the decoder 4 detects an address number out of the demodulated signal (step S104) and compares it with the address number stored in the EEPROM 2 (step S105).

If the two address numbers are identical (YES, step S105), the decoder 4 determines whether or not the address number is followed by a message (step S106). If the answer of the step S106 is NO, the decoder 4 performs an operation for detecting an address number as described later. If a message is present (YES, step S106), the decoder 4 identifies ID information matching the detected address code (step S107) and then interrupts the CPU 6 via an interrupt line 17 (step S108). In response, the CPU 6 receives the address code and message from the decoder 4 over the data bus 14 (step S109). The group information reception 61 receives the address code and message. The group write control 62 writes the address code and message fed from the reception 61 in the predetermined area of the RAM 7 while matching them to each other (step S110).

Figures 5, 10:
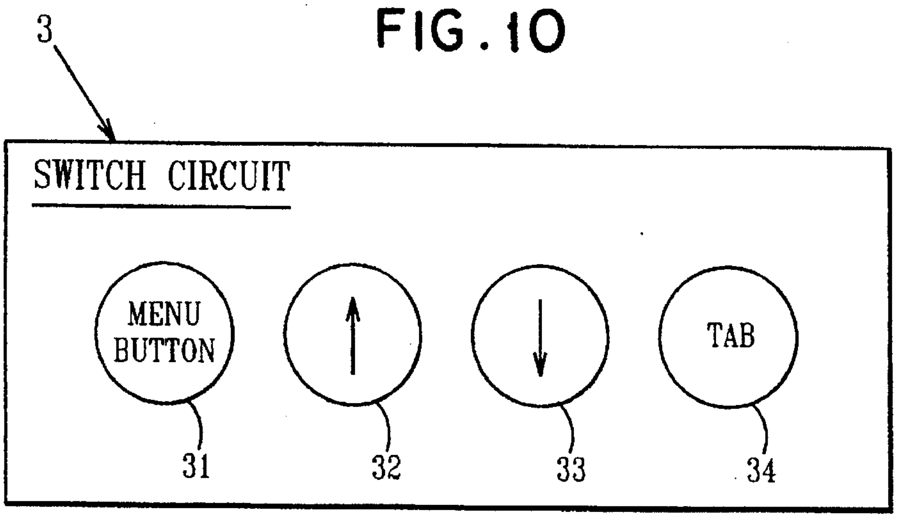
FIG. 5 illustrates a specific format in which received messages are stored.
FIG. 10 illustrates a specific configuration of a switching circuit included in the embodiment.

FIG. 5 illustrates a specific format in which received messages are stored in the RAM 7. As shown, the RAM 7 has message areas each being allocated to one address name. The messages are stored on an address name basis even when they are different ID information. Specifically, messages relating to the ID information "Private" are stored in a single group in the order in which they are received. This is also true with the messages relating to the ID information "Company" and messages relating to the ID information "Information". The embodiment allocates a plurality of ID information to a single caller, considering a case wherein the traffic from a particular caller is relatively heavy. Hence, messages may be stored on an ID information basis in place of the address name basis.

Referring again to FIG. 4, if the address number is not followed by a message (NO, step S106), the decoder 4 interrupts the CPU 6 (step S111). In response, the CPU 6 separates the address code (step S112) and writes it in the predetermined area of the RAM 7 (step S113).

As stated above, the embodiment stores received messages on an address name basis by detecting address codes included in paging signals.

FIG. 6 illustrates another specific relation between ID information corresponding to address codes and names. FIG. 7 illustrates another specific format in which messages are stored. As shown, an address name "Shibayama" is given to the ID information 1-A and 2-A while an address name "Company" is given to the ID information 1-B and 2-B. Address names "Weather Forecast" and "Stock Information" are respectively given to the ID information 3 and 4. Further, an address name "Others" is given to the ID information 5 and 6. As shown in FIG. 7, received messages are stored in the RAM 7 on an address name basis.

Figure 8A:
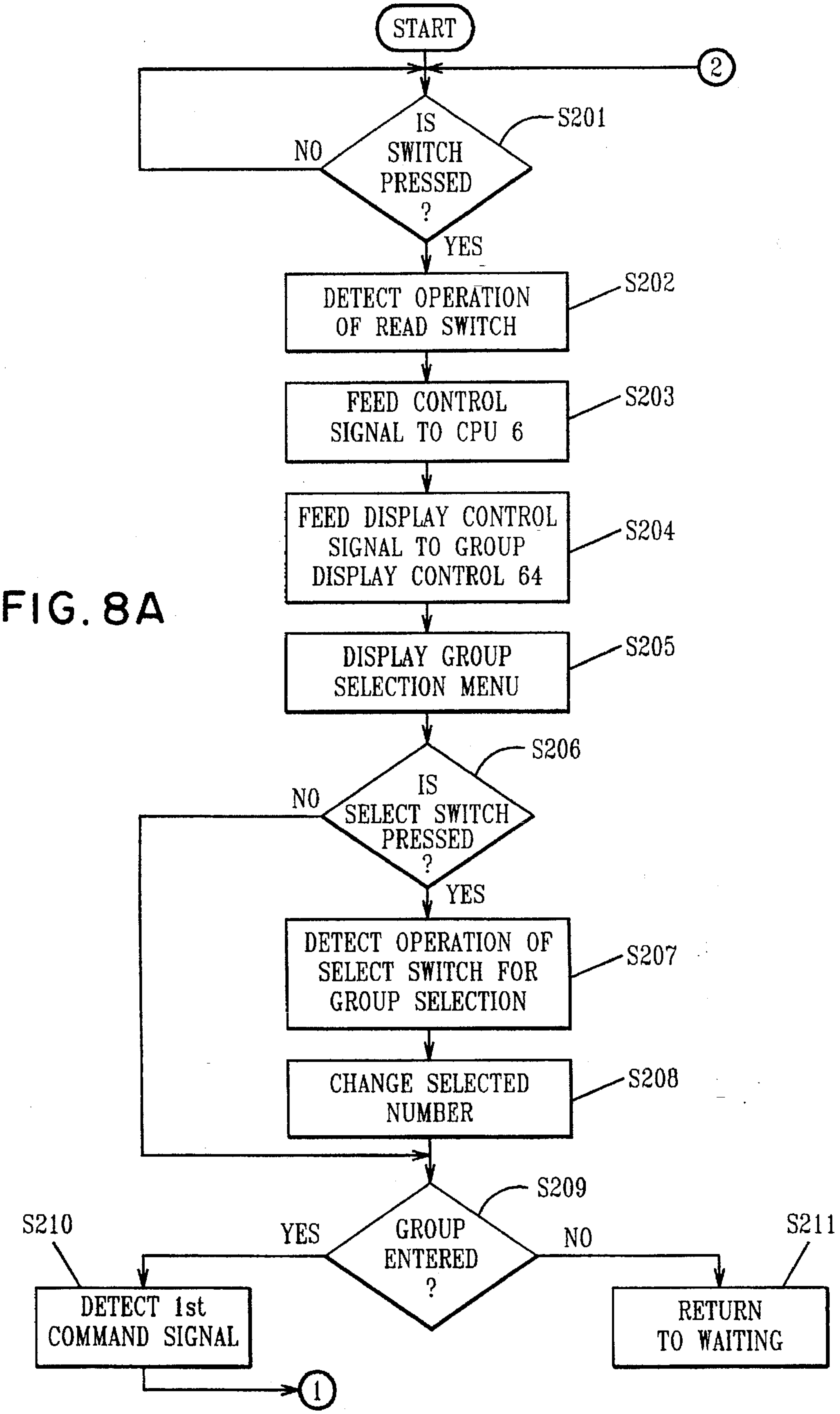
FIG. 8 is a flowchart demonstrating a message display procedure particular to the embodiment.
Figure 8B:
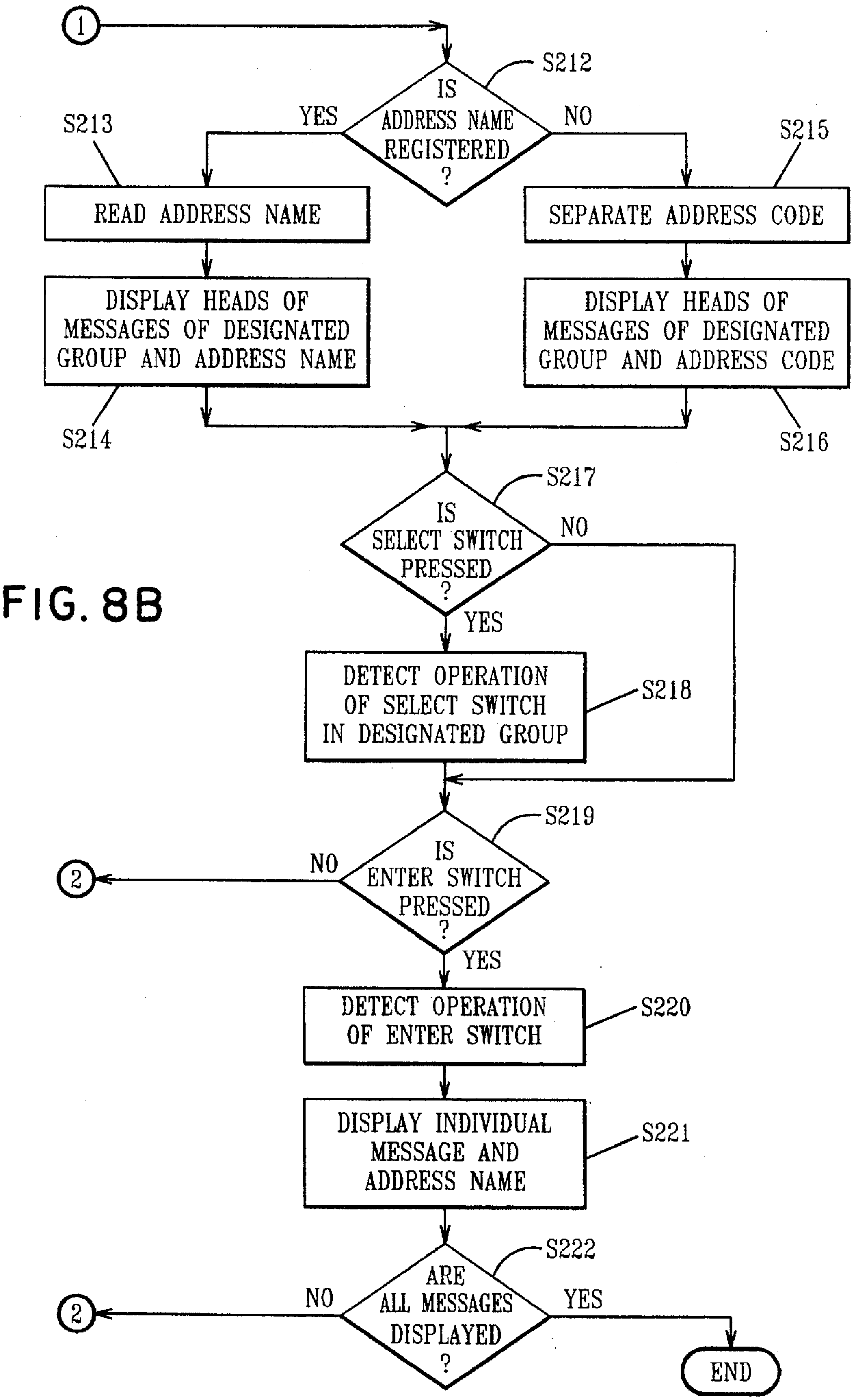
Figure 9A:
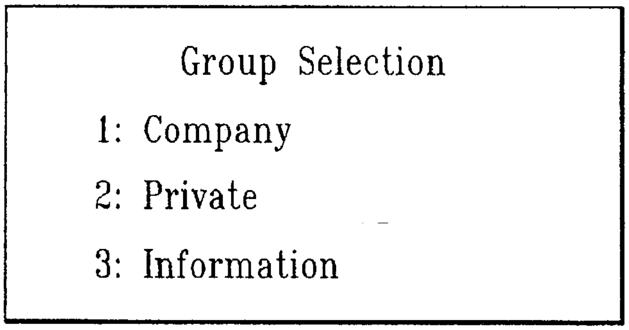
FIGS. 9A–9C illustrate a sequence of display pictures available with the embodiment and appearing in sequence.

A message display procedure particular to the embodiment will be described with reference to FIG. 8. When the switching circuit 3, preferably a message read switch, is pressed by the user (step S201), the decoder 4 detects it (step S202). In response, the decoder 4 sends a control signal to the group read control 63 of the CPU 6 over the control line 15 (step S203). The control 63 receives, in addition to the control signal, group information read out of the RAM 7. The control 63 feeds a display control signal to the group display control 64 in order to display a group selection menu on the LCD 8 (step S204). In response, the control 64 energizes the LCD driver 9. As a result, the LCD driver 9 causes the LCD 8 to display a group selection menu, e.g., one shown in FIG. 9A in accordance with the group information (step S205). There are provided three different groups, i.e., "Company", "Private" and "Information", as shown in FIGS. 3 and 5.

Every time the switching circuit 3, preferably a select switch, is pressed (step S206), the decoder 4 detects it (step S207) and changes the selection number appearing on the LCD 8 (step S208). When an enter switch is pressed (step S209), i.e., when the desired group to be read out is entered, the decoder 4 detects a first command signal (step S210). If the select switch is not pressed (NO, step S206), the decoder 4 determines whether or not the enter switch has been pressed. If the enter switch has not been pressed (NO, step S209), the pager waits for the arrival of a paging signal (step S211).

Figure 9B:
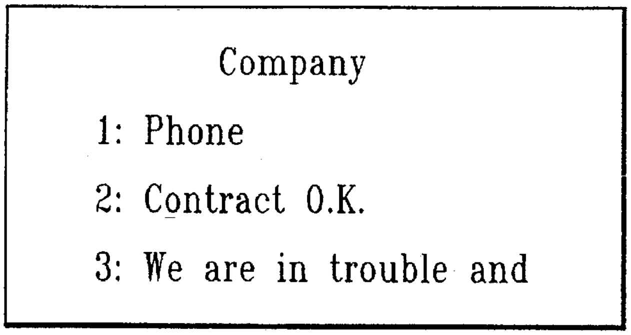

When the group to be read out is entered, the group read control 63 determines whether or not the address name is registered at the RAM 7 (step S212). If the answer of the step S212 is YES, the address name is read out (step S213). The group read control 64 produces a command for displaying the address name and the messages belonging to the designated group on the LCD 8. In response, the group display control 64 causes the LCD 8 to display a group read picture, e.g., one shown in FIG. 9B via the LCD driver 9 (step S214). FIG. 9B shows a specific condition wherein the group "Company" was selected on the picture of FIG. 9A and then entered. In this case, three messages received from the company appear on the LCD 8, a message "Phone" received first leads the message group. When four or more messages belonging to the same group are received, a mark indicative of "next" may be displayed on the LCD 8. Then, the fourth and successive messages will appear on the LCD 8 when the select switch is pressed.

As stated above, a group representative of the name of a caller is displayed together with messages. This allows the user to easily identify the caller who sent the messages.

Referring again to FIG. 8, when the address name is not registered (NO, step S212), the group read control 63 reads the address code out of the RAM 7 (step S215). Then, the control 63 commands the group display control 64 to display the address code and the messages belonging to the designated group on the LCD 8. In response, the control 64 displays the address code in place of an address name on the LCD 8 (step S216).

Figure 9C:
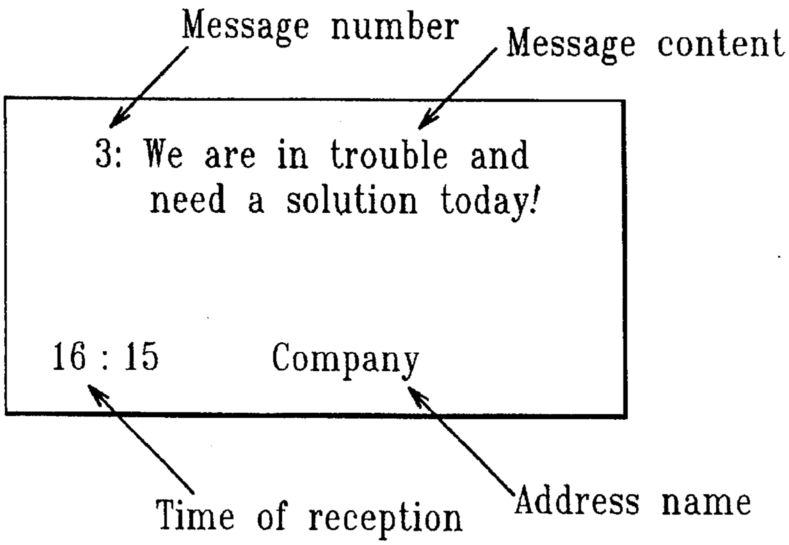

Subsequently, when the select switch is pressed by the user (step S217), the decoder 4 detects it (step S218). When the user presses the enter switch after the select switch (step S219), the decoder 4 detects a second command signal (step S220). In response, the decoder 4 sends a control signal to the group read control 63. On receiving the second control signal, the control 63 commands the group display control 64 to display the message selected on a group basis on the LCD 8 together with the address name. As a result, the control 64 causes the LCD 8 to display an individual read picture, e.g., one shown in FIG. 9C on the LCD 8 (step S221). FIG. 9C shows a specific condition wherein the third message is selected on the picture of FIG. 9B and then entered. While the third message is only partly visible on the picture of FIG. 9B, it is entirely displayed on the picture of FIG. 9C together with the time of reception and the address name.

The group read control 63 determines whether or not desired one of the received messages has been entirely displayed on the basis of the user's operation of the switch (step S222). For example, when the read switch is double clicked, the decoder 4 detects it. The control 63 causes the initial group selection picture to appear on the LCD 8. When the read switch is pressed once, the immediately preceding picture again appears on the LCD 8. When the read switch is not pressed within a predetermined period of time, e.g., 40 seconds, the read and display control procedure ends. This procedure also ends when a power switch, not shown, provided on the pager is turned off.

FIG. 10 shows a specific arrangement of the switching circuit 3. As shown, the circuit 3 has a menu switch 31, scroll switches 32 and 33, and a tab switch 34. The switch 31, switches 32 and 33, and switch 34 respectively play the role of the read switch, select switch, and enter switch stated above.

In summary, a radio selective calling receiver of the present invention receives a plurality of address codes and messages following them, stores the messages and address codes while matching them to each other, and displays the messages together with an address name stored beforehand and matching designated one of the address codes. Hence, the user of the receiver can easily see which of a plurality of callers has sent the messages.

Further, in accordance with the present invention, the address codes given the same address name are stored in a single group. A predetermined number of messages are displayed in a group in response to a first command signal. Then, desired one of the messages is displayed in response to a second command signal. Hence, when a plurality of messages are received from a single caller, they are displayed in a single picture and allows the user to select one of them. The pager of the invention is, therefore, easy and convenient to use.

While the invention has been described with reference to a specific embodiment thereof, it will be appreciated by those skilled in the art that numerous variations, modifications and embodiments are possible, and accordingly, all such variations, modifications and embodiments are to be regarded as being within the spirit and scope of the invention.

What is claimed is:

1. A radio selective calling receiver having a plurality of address codes, comprising:

a memory for storing a plurality of received messages on the basis of each of a plurality of group names corresponding to a caller who sent said messages, said plurality of address codes being classified to said plurality of group names according to callers, at least one of said plurality of group names corresponding to at least two of said plurality of address codes.

2. A radio selective calling receiver as claimed in claim 1, further comprising:

a receiver for receiving the plurality of messages and the plurality of address codes;

and reading means for reading the plurality of messages out of said memory.

3. A radio selective calling receiver as claimed in claim 1, further comprising:

a display for displaying said plurality of messages together with the group name at the same time.

4. A radio selective calling receiver as claimed in claim 2, wherein said reading means comprises a message read switch for reading the message, a select switch for selecting said message or the name, and an input device for entering said message or said name selected.

5. A radio pager having a plurality of addresses, comprising:

a receiver for receiving address codes respectively corresponding to the plurality of addresses, and messages; and a memory for storing the messages together with one of a plurality of group names corresponding to a caller who sent said messages, said plurality of address codes being classified to a plurality of group names according to callers, at least one of said plurality of group names corresponding to at least two of said plurality of address codes.

6. A radio pager as claimed in claim 5, further comprising:

a display for displaying one of said plurality of group names and said messages stored in said memory on the group name basis.

7. A radio pager as claimed in claim 6, wherein when the message is to be read out of said memory, one of the names is selected, and one of the messages corresponding to the name selected is selected.

8. A method of controlling display of a message, comprising the steps of:

inputting a plurality of messages and a plurality of address codes;

storing the plurality of messages on a group name basis, said group name corresponding to a caller of said plurality of messages, said plurality of address codes being classified to a plurality of group names according to callers, at least one group name indicating at least two address codes;

reading out, when the message is to be read out, the group name stored beforehand in correspondence with the address code; and displaying the message and the group name together.

9. A method as claimed in claim 8, further comprising the steps of displaying, when the message is to be read out, a plurality of names registered beforehand; and displaying one of the plurality of names selected and the message associated with the name selected.

10. A method as claimed in claim 9, further comprising the step of, when a plurality of messages are associated with the name selected, displaying said plurality of messages.

11. A method as claimed in claim 10, wherein excess messages which cannot be displayed are displayed afterwards in response to a user's operation.

12. A method as claimed in claim 10, wherein one of the messages selected is displayed together with a time of reception and the name selected.

* * * * *